US00RE39617E

(19) United States
(12) Reissued Patent
Handlin, Jr. et al.

(10) Patent Number: US RE39,617 E
(45) Date of Reissued Patent: May 8, 2007

(54) BUTADIENE POLYMERS HAVING TERMINAL FUNCTIONAL GROUPS

(75) Inventors: Dale L. Handlin, Jr., Houston, TX (US); Daniel E. Goodwin, Katy, TX (US); Carl L. Willis, Houston, TX (US); David J. St. Clair, Houston, TX (US); John D. Wilkey, Owasso, OK (US); Michael J. Modic, Houston, TX (US); Craig A. Stevens, Marietta, OH (US)

(73) Assignee: Kraton Polymers US LLC, Belpre, OH (US)

(21) Appl. No.: 10/655,988

(22) Filed: Sep. 5, 2003

Related U.S. Patent Documents

Reissue of:
(64) Patent No.: 5,405,911
Issued: Apr. 11, 1995
Appl. No.: 08/306,552
Filed: Sep. 15, 1994

U.S. Applications:

(62) Division of application No. 07/938,917, filed on Aug. 31, 1992, now Pat. No. 5,393,843.

(51) Int. Cl.
*C08F 8/00* (2006.01)

(52) U.S. Cl. ..... 525/139; 525/170; 525/171; 525/182; 525/183; 525/184; 525/332.8; 525/332.9; 525/333.1; 525/333.2; 525/378; 525/379; 525/383; 525/384; 525/386

(58) Field of Classification Search ..... 525/139, 525/170, 171, 182, 183, 184, 332.8, 332.9, 525/333.1, 333.2, 378, 379, 383, 384, 386
See application file for complete search history.

(56) References Cited

U.S. PATENT DOCUMENTS

| | | | | |
|---|---|---|---|---|
| 2,693,461 | A | | 11/1954 | Jones et al. |
| 2,864,809 | A | | 11/1958 | Jones et al. |
| 3,415,898 | A | | 12/1968 | Walker |
| RE27,145 | E | | 6/1971 | Jones |
| 3,629,172 | A | | 12/1971 | Jones |
| 3,770,698 | A | | 11/1973 | Riew |
| 3,935,342 | A | | 1/1976 | Lim |
| 3,994,868 | A | | 11/1976 | Inomata et al. |
| 4,020,125 | A | | 4/1977 | Suzuki et al. |
| 4,028,485 | A | | 6/1977 | Poloso et al. |
| 4,039,593 | A | * | 8/1977 | Kamienski et al. |
| 4,075,289 | A | | 2/1978 | Falk |
| 4,079,098 | A | | 3/1978 | Rossmy et al. |
| 4,469,829 | A | | 9/1984 | Konietzny et al. ..... 525/333.2 |
| 4,496,613 | A | | 1/1985 | Zagefka et al. ..... 525/332.8 |
| 4,507,430 | A | | 3/1985 | Shimada et al. |
| 4,595,749 | A | | 6/1986 | Hoxmeier |
| 4,730,031 | A | | 3/1988 | Sato et al. |
| 4,855,509 | A | | 8/1989 | Dave et al. |
| 4,857,615 | A | | 8/1989 | Bronn et al. |
| 4,857,618 | A | | 8/1989 | Silver et al. |
| 4,866,120 | A | | 9/1989 | Rudnick et al. |
| 4,906,691 | A | | 3/1990 | Joseph et al. |
| 4,994,526 | A | * | 2/1991 | Peters |
| 4,994,532 | A | | 2/1991 | Hawkins et al. |

FOREIGN PATENT DOCUMENTS

| | | | |
|---|---|---|---|
| BE | 793660-Q | | 5/1973 |
| DD | 147247 | | 3/1981 |
| DD | 208470 | A | 5/1984 |
| DD | 208471 | A | 5/1984 |
| DD | 234-682 | A | 4/1986 |
| DD | 234683 | A | 4/1986 |
| DE | 3342766 | A | 5/1984 |
| EP | 0209956 | | 7/1986 |
| FR | 1520489 | | 12/1974 |
| GB | 1373045 | | 11/1974 |
| GB | 1520489 | | 8/1978 |
| JP | 1373045 | | 9/1971 |
| JP | 5 9053515 | A | 3/1984 |
| JP | 5 9053516 | A | 3/1984 |
| JP | 6 0052845 | A | 3/1985 |
| JP | 6 3268703 | A | 11/1988 |
| JP | 6443503 | | 2/1989 |
| WO | 91/12277 | | 8/1991 |

OTHER PUBLICATIONS

Yves Camberlin et al.; *Synthesis and Properties of Partially or Fully Hydrogenated Dienic Oligomers*, Macromol. Chem 180 2309–2321 (1979), 3 Tables, 9 Figs.

A. J. Di Milo et al.; *Saturated Hydrocarbon Polymers for Solid Rocket Propellants*, J. Macromol. Sci–Chem, A3(7), Nov. 1969, pp. 1419–1442, 8 Tables, 15 Figs.

Karel Bouchal et al.; *The Hydrogenation of HO–Terminated Telechelic Polybutadienes in the Presence of a Homogeneous Hydrogenation Catalyst Based on Tris(triphenylphosphine) rhodium Chloride*, Angewandre Makromoleculare Chemic 165 (1989) pp. 165–180 (Nr. 2716).

P. Lutz, E. Franta & P. Rempp, "An Efficient Bifunctional Lithium–Organic Initiator To Be Used in Apolar Solvents", 1982, pp. 1953–1959.*

F. Bandermann, H. Speikamp & L. Weigel, "Bifunctional Anioic Initiators", Makromol. Chem., 2017–2024 (1985).*

G. Bienert et al., "A Bifunctional Anioic Initiator Soluble in Polar Solvents", Makromol. Chem. 179, 551–555 (1978).*

T.–P. Liao & J. P. Kennedy, "New Telechelic Polymers and Sequential Copolymers by Polyfunctional Initiator–Transfer Agents", Inst. of Poly. Sci., U. of Akron, Akron, Ohio, pp. 233–240.*

* cited by examiner

*Primary Examiner*—Bernard Lipman
(74) *Attorney, Agent, or Firm*—Gene L. Tyler

(57) ABSTRACT

Hydrogenated butadiene polymers having terminal functional groups have minimum viscosity at any molecular weight when the 1,2-addition is between 30% and 70% Hydrogenated butadiene polymers having about two terminal hydroxyl groups per molecule have surprisingly lower viscosities at 30% to 70% 1,2-addition than similar polymers having either higher or lower amounts of 1,2-addition. The polymers are useful in making coatings, sealants, binders, and block copolymers with polyesters, polyamides, and polycarbonates.

21 Claims, 1 Drawing Sheet

BUTADIENE POLYMERS HAVING TERMINAL FUNCTIONAL GROUPS

Matter enclosed in heavy brackets [ ] appears in the original patent but forms no part of this reissue specification; matter printed in italics indicates the additions made by reissue.

This is a division of application Ser. No. 07/938,917, filed Aug. 31, 1992.

BACKGROUND OF THE INVENTION

This invention relates to manufacture of low viscosity hydrogenated butadiene polymers having terminal functional groups and use of the low viscosity polymers to make coatings and other high molecular weight polymers.

Anionic polymerization of conjugated dienes with lithium initiators, such as sec-butyllithium, and hydrogenation of residual unsaturation has been described in many references including U.S. Pat. No. Re. 27,145 which teaches a relationship between the amount of 1,2-addition of butadiene (35% to 55%) and the glass transition temperatures of the hydrogenated butadiene polymers.

The termination of living anionic polymers to form functional end groups is described in U.S. Pat. Nos. 4,417,029, 4,518,753, and 4,753,991. Of particular interest for the present invention are terminal hydroxyl, carboxyl, phenol, epoxy, and amine groups.

For unsaturated 1,3-butadiene polymers it is known that low 1,2-addition is necessary to obtain low viscosity as taught in U.S. Pat. Nos. 4,518,753 and 3,652,732. However, when these polymers are hydrogenated they are crystalline solids. Such a crystalline polymer is available from Mitsubishi and is designated POLYTAIL H polymer which has a melting point of 72° C.

The hydrogenated butadiene polymers are non-crystalline when the 1,2-addition of butadiene is above 30% as described in U.S. Pat. No. 4,020,125. The non-crystalline hydrogenated butadiene polymers are viscous liquids at low molecular weights as described in U.S. Pat. Nos. 4,866,120 and 4,020,125. POLYTAIL HA polymer produced by Mitsubishi and NISSO GI-2000 polymer produced by Nippon Soda are commercial examples of low molecular weight hydrogenated butadiene polymers which have terminal functional groups and 1,2-addition of about of 84%.

It is an object of the present invention to provide hydrogenated butadiene polymers having terminal functional groups and low viscosity at room temperature. It is also an object of the invention to use the low viscosity polymers to make coatings and other high molecular weight polymers.

SUMMARY OF THE INVENTION

Applicants have discovered that varying the amount of 1,2-addition of butadiene in hydrogenated butadiene polymers having terminal functional groups significantly and unexpectedly impacts the viscosity of the polymers. The lowest viscosity for any given molecular weight of a hydrogenated butadiene polymer having terminal functional groups is achieved when the 1,2-addition is between 30% and 70%, preferably between 40% and 60%.

The hydrogenated butadiene polymers of the invention may be used without solvents at room temperature when the peak molecular weight, as measured by gel permeation chromatography, is between 500 and 20,000, preferably between 1,000 and 10,000.

DETAILED DESCRIPTION OF THE INVENTION

Figure 1:
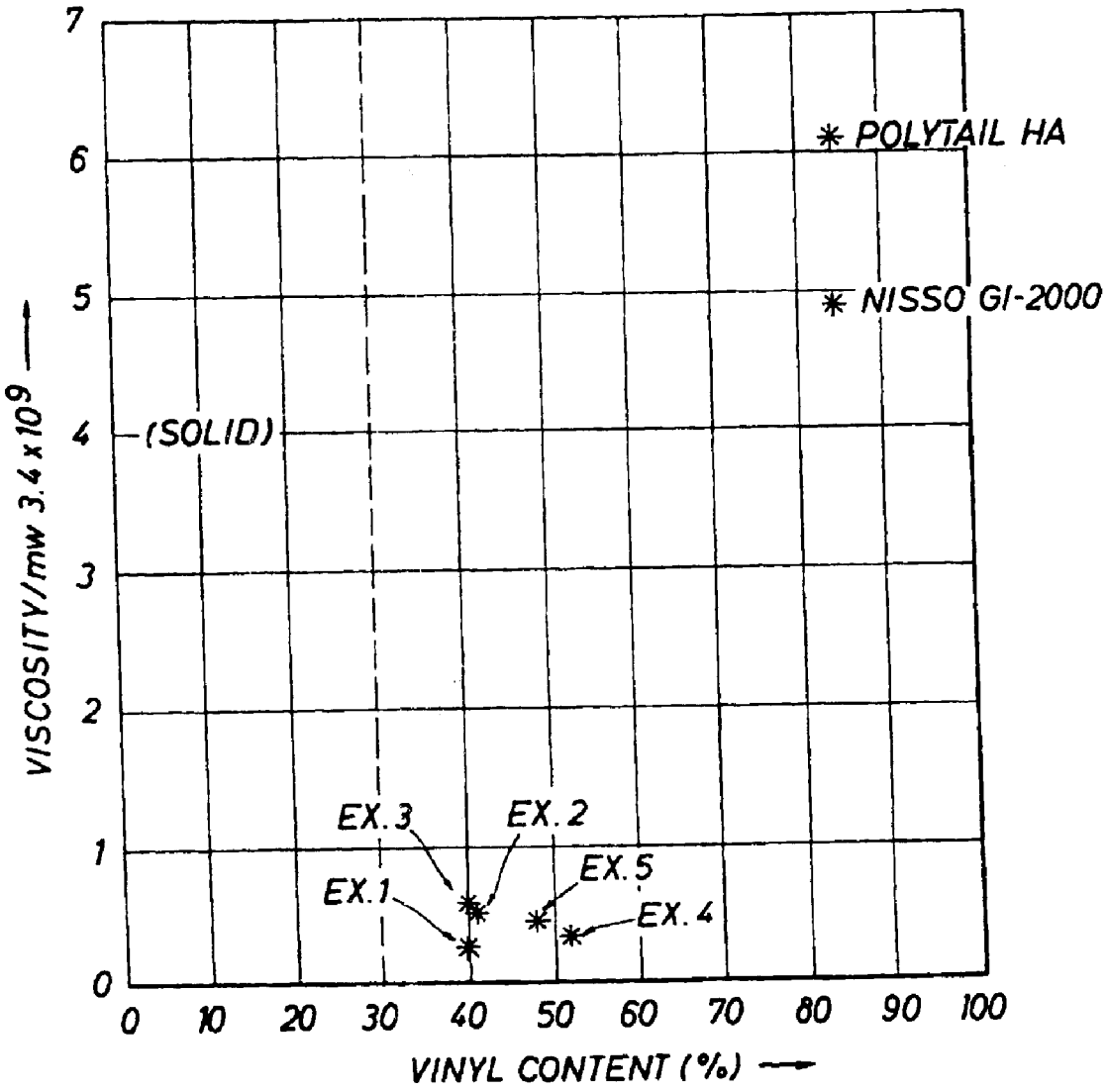
FIG. 1 is a plot of the relationship between vinyl content and viscosity of hydrogenated 1,3-butadiene polymers having terminal functional groups. The viscosity data are adjusted to remove molecular weight contributions by dividing the viscosity by the peak molecular weight raised to the 3.4 power.

Anionic polymerization of conjugated diene hydrocarbons with lithium initiators is well known as described in U.S. Pat. Nos. 4,039,593 and Re. 27,145 which descriptions are incorporated herein by reference. Polymerization commences with a monolithium, dilithium, or polylithium initiator which builds a living polymer backbone at each lithium site. Typical living polymer structures containing polymerized conjugated diene hydrocarbons are:

X—B—Li
X—A—B—Li
X—A—B—A—Li
Li—B—Y—B—Li
Li—A—B—Y—B—A—Li wherein B represents polymerized units of one or more conjugated diene hydrocarbons such as butadiene or isoprene, A represents polymerized units of one or more vinyl aromatic compounds such as styrene, X is the residue of a monolithium initiator such as sec-butyllithium, and Y is the residue of a dilithium initiator such as the diadduct of sec-butyllithium and m-diisopropenylbenzene. Some structures, including those pertaining to polylithium initiators or random units of styrene and a conjugated diene, generally have limited practical utility although known in the art.

The anionic polymerization of the conjugated diene hydrocarbons is typically controlled with structure modifiers such as diethylether or glyme (1,2-diethoxyethane) to obtain the desired amount of 1,4-addition. As described in Re 27,145 which is incorporated by reference herein, the level of 1,2-addition of a butadiene polymer or copolymer can greatly affect elastomeric properties after hydrogenation.

The 1,2-addition of 1,3-butadiene polymers having terminal functional groups significantly and surprisingly influences the viscosity of the polymers as described in more detail below. A 1,2-addition of about 40% is achieved during polymerization at 50° C. with about 6% by volume of diethylether or about 1000 ppm of glyme.

Dilithium initiation with the diadduct of sec-butyllithium (s—BuLi) and m-diisopropenylbenzene also requires presence of a non-reactive coordinating agent such as diethyl ether, glyme, or triethyl amine, otherwise monolithium initiation is achieved. Ether is typically present during anionic polymerization as discussed above, and the amount of ether typically needed to obtain specific polymer structures has been sufficient to provide dilithium initiation.

Anionic polymerization is often terminated by addition of water to remove the lithium as lithium hydroxide (LiOH) or by addition of an alcohol (ROH) to remove the lithium as a lithium alkoxide (LiOR). For polymers having terminal functional groups, the living polymer chains are preferably terminated with hydroxyl, carboxyl, phenol, epoxy, or amine groups by reaction with ethylene oxide, carbon dioxide, a protected hydroxystyrene monomer, ethylene oxide plus epichlorohydrin, or the amine compounds listed in U.S. Pat. No. 4,791,174, respectively.

Termination with ethylene oxide results in release of fine particles of lithium bases as described in U.S. Pat. application Ser. No. 07/785,715, now U.S. Pat. No. 5,166,277 which is incorporated by reference herein. The lithium bases interfere with hydrogenation of the polymer and preferably are removed.

Termination with carbon dioxide results in carboxylate salt groups that reduce hydrogenation catalyst activity as described in U.S. Pat. No. 4,970,254, which disclosure is incorporated by reference herein. Improved hydrogenation is obtained by converting the carboxylate salt groups to ester groups prior to hydrogenation and then reconverting to carboxylate salt or carboxylic acid groups after hydrogenation.

Hydrogenation of at least 90%, preferably at least 95% of the unsaturation in low molecular weight butadiene polymers is achieved with nickel catalysts as described in U.S. Pat. No. Re. 27,145 and 4,970,254 and U.S. Pat. application Ser. No. 07/785,715 which are incorporated by reference herein. The preferred nickel catalyst is a mixture of nickel 2-ethylhexanoate and triethylaluminum described in more detail in Example 1 below.

Butadiene polymers having two or more terminal functional groups selected from hydroxyl, carboxyl, phenol, epoxy, and amine groups can be used without solvents when the viscosity of the polymer is less than about 500 poise. These functional groups do not exhibit significant atomic attractions that would otherwise solidify the functionalized polymers. Hydrogenated butadiene polymers having a lower viscosity than 500 poise are produced by limiting the peak molecular weight to a range from 500 to 20,000 and by limiting the 1,2-addition to an amount between 30% and 70%, preferably between 40% to 60%.

It is well known that the viscosity of higher molecular weight polymers is proportional to molecular weight raised to the 3.4 power as described by D. W. Van Krevelen, "Properties of Polymers" Elsevier Scientific Pub Co., New York, 1976, pp. 337–339, and J. D. Ferry, "Viscoelastic Properties of Polymers" John Wiley & Sons, New York, 1970, pp 267–271. For low molecular weight polymers having no functional groups, viscosity is proportional to molecular weight to the first power. Low molecular weight polymers having terminal functional groups behave like higher molecular weight polymers. Therefore, in comparing the viscosity of low molecular weight polymers having terminal functional groups, viscosity data must be adjusted for molecular weight variations by dividing measured viscosity by molecular weight raised to the 3.4 power.

The polymers of the invention have the conventional utilities such as forming coatings, sealants, and binders. In addition, the butadiene polymers having about two or more terminal hydroxyl groups can be co-polymerized with conventional compounds during production of polycarbonates, polyesters, and polyamides as described in U.S. Pat. No. 4,994,526 which is incorporated herein by reference.

DETAILED DESCRIPTION OF PREFERRED EMBODIMENTS

Hydrogenated 1,3-butadiene polymers having about two terminal groups per molecule and unexpectedly low viscosity have been produced by controlling the 1,2-addition of the butadiene. Such polymers are low viscosity liquids at room temperature when the peak molecular weight of the polymer ranges between 1,000 and 10,000, as measured by gel permeation chromatography using polybutadiene standards, and the 1,2-addition ranges from 40% to 60%. The examples below show that 1,2-addition of the hydrogenated butadiene polymers has an unexpected effect on viscosity.

The peak molecular weights were measured using gel permeation chromatography calibrated with polybutadiene standards having known peak molecular weights. The solvent for all samples was tetrahydrofuran.

The 1,2-additions vinyl contents was measured by $C^{13}$ NMR in chloroform solution.

The viscosities were measured at room temperature on a Rheometrics Dynamic Mechanical Spectrometer in dynamic oscillatory mode at a frequency of 10 radians per second. Viscosity measurements were adjusted for comparison by division with peak molecular weight raised to the 3.4 power. Peak molecular weights are believed to best indicate molecular weight variations in the polymers of this invention and are determined from standards having known peak molecular weights rather than by approximation.

EXAMPLE 1

A linear hydrogenated butadiene polymer having about two terminal hydroxyl groups per molecule, a peak molecular weight of 2900, as determined by Gel Permeation Chromatography (GPC) using polybutadiene standards, and a 1,2-addition of 40%, as determined by a Nuclear Magnetic Resonance (NMR) technique, was prepared as described below. The linear butadiene precursor polymer was synthesized using a diinitiator for the polymerization of 1,3-butadiene. The living polymer chain ends were capped using ethylene oxide to afford the precursor polymer having terminal, primary hydroxyl functionality. This polymer was hydrogenated using a Ni/Al catalyst.

To synthesize the diinitiator moiety, 100 pounds of cyclohexane, 6 pounds of diethyl ether, and 1564 g of m-diisopropenylbenzene (DIPB) (97% wt DIPB, 9.6 moles) were combined with stirring in a sealed, steel reactor vessel under an inert, nitrogen atmosphere. Impurities that might interfere with anionic polymerization were removed by titration with a solution of s—BuLi in cyclohexane (0.09 g of s—BuLi/ml). The purified solution was then treated with 2 equivalents of s—BuLi (23.5 pounds of s—BuLi solution, 19 moles) for each equivalent of DIPB that was present. Reaction at 50° C. for 30 minutes gave a solution of the expected diinitiator. The structure of the diinitiator was verified by analyzing a methanol quenched aliquot of the solution using a gas chromatography-mass spectroscopy (GC-MS) technique.

In a separate vessel, 162 pounds of cyclohexane, 15 pounds of diethyl ether, and 42 pounds of polymerization grade 1,3-butadiene were combined under a nitrogen atmosphere at 20° C. As described above, the solution was titrated with. s—BuLi reagent to remove impurities that would interfere with the anionic polymerization of butadiene. The purified solution of monomer was transferred to the vessel containing the diinitiator and polymerization ensued. The polymerization exotherm was controlled by cooling the reactor to keep the temperature of the reaction mixture below 50° C. After 30 minutes, the polymerization reaction was essentially complete. An alpha, omega-polymer lithium species (Li—B—Y—B—Li) had been synthesized.

The solution containing the diinitiated polymer was treated, at 50° C., with 7.5 pounds of ethylene oxide (77 moles) to insert —C—C—O— at the polymer chain ends to form alkoxide polymer chain ends, —C—C—C—O—Li. Reaction was allowed to proceed for 3 hours. At this point, the reaction mixture was a solid rubbery mass resulting from the formation of an ionic gel derived from association of the alkoxide polymer chain ends. Treatment of the gel with 610 g of methanol afforded a free flowing solution of a polybutadiene diol having —C—C—O—H end caps and a precipitate of lithium methoxide (LiOMe). The precipitate was allowed to settle in the reactor overnight.

A LiOMe slurry was drained from the bottom of the vessel and discarded. An aliquot of the clear solution of the butadiene polymer having terminal hydroxyl groups was analyzed via GPC and found to contain a single polymeric species having a peak molecular weight of 2900. Average molecular weights were calculated from the GPC data as M(n)=2470 and M(w)=2940.

Analysis by C(13)NMR found the 1,2-addition to be 40% and the ethylene oxide end capping efficiency was 82% (100 times the ratio of moles of —C—C—O—H end caps to moles of s—BuLi initiator).

A 10 gallon aliquot of the solution of the butadiene polymer having terminal hydroxyl groups was transferred to a high pressure reactor for hydrogenation using a Nickel/Aluminum catalyst. The catalyst was prepared in advance by reacting nickel 2-ethylhexanoate with triethylaluminum in cyclohexane in amounts sufficient to give a ratio of 2.6 moles of aluminum to 1 mole of nickel. The polymer solution was sparged with hydrogen at 65° C. The reactor was then filled with hydrogen to a pressure of 810 psig. An initial aliquot of the Ni/Al catalyst solution was then pressured into the reactor in such a volume as to afford a Ni concentration of 100 ppm in the reaction mixture. An exothermic hydrogenation reaction ensued.

When the temperature of the reaction solution had stabilized, an aliquot of the solution was analyzed by ozonolysis to check the degree of hydrogenation of the polybutadiene diol. As hydrogenation was incomplete, another aliquot of catalyst was added which lead to an additional exotherm. This process was repeated until the ozonolysis test showed essentially complete hydrogenation of the polybutadiene diol (final reaction conditions - [Ni]=1900 ppm, 95° C., 6 hr). An aliquot of the polymer solution was analyzed by C(13)NMR, by this method of analysis, 95% of the carbon-carbon unsaturation (—C═C—) had been hydrogenated and there was no evidence of hydrogenolysis of the terminal hydroxyl groups.

The hydrogenation catalyst was removed from the polymer cement by contacting with an excess of 1% by weight aqueous sulfuric acid solution (organic/aqueous=⅓(vol/vol)). The organic phase was washed repeatedly with water to remove excess sulfuric acid. Ammonia gas was bubbled through the organic phase to ensure complete neutralization. An antioxidant, Irganox 1076, was added to the cement in an amount to afford a concentration of 0.1% by weight in the final product. The solvent was removed from the polymer under vacuum affording a clear, low viscosity liquid, hydrogenated butadiene polymer having about two terminal hydroxyl groups per molecule. The properties of this sample are listed in Tables 1 and 2 which follow the description of Examples 2–5 below. Several commercial hydrogenated polybutadiene diols are included for comparison.

EXAMPLES 2–5

The procedure of Example 1 was modified to prepare a series of hydrogenated butadiene polymers having about two terminal hydroxyl groups per molecule, different peak molecular weights, and different amounts of 1,2-addition. The molecular weight of the diol was adjusted by varying the diinitiator to monomer ratio during polymerization of the butadiene. The 1,2-addition was varied by adjusting the diethyl ether content of the solvent before polymerization and by adjusting the temperature at which the butadiene polymerization was conducted. Higher levels of 1,2-addition were favored by higher levels of diethyl ether and lower reaction temperatures. Synthesis in this way afforded products with the structures of Table 1 and properties of Table 2.

TABLE 1

| Example Number | MW (Peak) | 1,2-Addition (%) | EO Capping Efficiency (%) | Hydrogenation (%) |
|---|---|---|---|---|
| 1 | 2900 | 40 | 82 | 95 |
| 2 | 3900 | 41 | 95 | 98 |
| 3 | 5060 | 40 | 92 | 99 |
| 4 | 3500 | 52 | 87 | 98 |
| 5 | 3970 | 48 | 85 | 99 |
| POLYTAIL HA[1] | 2300 | 84 | NA | 99[3] |
| NISSO GI-2000[2] | 2380 | 84 | NA | 98[3] |
| POLYTAIL H[1] | 3720 | 22 | NA | NA |

[1]Polymer produced by Mitsubishi.
[2]Polymer produced by Nippon Soda.
[3]Measured by ozonolysis.

TABLE 2

| Example Number | MW (Peak) | 1,2-Addition (%) | Viscosity (poise) | Adj. Viscosity (poise/MW[3,4]) |
|---|---|---|---|---|
| 1 | 2900 | 40 | 155 | $0.26 \times 10^{-9}$ |
| 2 | 3900 | 41 | 836 | $0.52 \times 10^{-9}$ |
| 3 | 5060 | 40 | 2322 | $0.59 \times 10^{-9}$ |
| 4 | 3500 | 52 | 353 | $0.32 \times 10^{-9}$ |
| 5 | 3970 | 48 | 760 | $0.44 \times 10^{-9}$ |
| POLYTAIL HA[1] | 2300 | 84 | 1650 | $6.1 \times 10^{-9}$ |
| NISSO GI-2000[2] | 2380 | 84 | 1480 | $4.9 \times 10^{-9}$ |
| POLYTAIL H[1] | 3720 | 22 | Solid[3] | — |

[1]Polymer produced by Mitsubishi.
[2]Polymer produced by Nippon Soda.
[3]Infinite viscosity at room temperature.

The relationship between viscosity and 1,2-addition for the hydrogenated butadiene polymers is plotted in FIG. 1 wherein the viscosity data is adjusted to remove molecular weight variations as described above.

For many applications such as coatings it is desirable to have polymers that have terminal functional groups and have low viscosity at room temperature to allow application without any solvent, preferably at the highest possible solids content. While it is known in the art that hydrogenated butadiene polymers having less than 30% 1,2-addition are crystalline solids, Table 2 and FIG. 1 show that 1,2-addition between 30 and 70% provides surprisingly low viscosities at room temperature for hydrogenated butadiene polymers having terminal groups. The polymers of the invention preferably have a ratio of viscosity (poise) to peak molecular weight raised to the 3.4 power of at most $2.0\times10^{-9}$, most preferably less than $1.0\times10^{-9}$.

Results for Examples 2 and 3 validate the theoretical relationship between viscosity and peak molecular weight. The ratios of viscosity to peak molecular weight raised to the 3.4 power for Examples 2 and 3 are almost identical although the polymers have significantly different molecular weights and significantly different viscosities.

EXAMPLE 6 (HYPOTHETICAL)

A hydrogenated butadiene polymer having terminal hydroxyl groups is prepared as described in Example 1 except that the ratio of diinitiator to butadiene monomer is adjusted to provide a peak molecular weight of 10000.

EXAMPLE 7 (HYPOTHETICAL)

A hydrogenated butadiene polymer having terminal hydroxyl groups is prepared as described in Example 1 except that the ratio of diinitiator to butadiene monomer is adjusted to provide a peak molecular weight of 16000.

EXAMPLE 8 (HYPOTHETICAL)

A linear, hydrogenated butadiene polymer having a peak molecular weight of 4000, about two terminal carboxyl groups per molecule, and 1,2-addition of 50% is produced by the procedure of Example 1 with the following modifications.

Polymerization is conducted at 15° C. with 10% diethyl ether to obtain 50% 1,2-addition.

The precursor butadiene polymer having terminal lithium atoms is carboxylated by pumping the polymer solution through a pipeline reactor wherein the solution is contacted in a static mixer with high pressure carbon dioxide. Efficient mixing and high pressure minimize coupling of polymer molecules.

The carboxylated polymer can be hydrogenated by the procedure of Example 1 if a large excess of the nickel catalyst is used to overcome reduced activity caused by the carboxyl groups. The carboxylated polymer is preferably hydrogenated after esterification of the carboxylate groups with methanol and an acid catalyst as described in U.S. Pat. No. 5,002,676. After hydrogenation, the ester groups are converted back to carboxylate groups by washing with a mixture a sulfuric acid/water which also removes the hydrogenation catalyst.

EXAMPLE 9 (HYPOTHETICAL)

A linear, hydrogenated butadiene polymer having a peak molecular weight of 4000, about two terminal amine groups per molecule, and 1,2-addition of 50% is produced by the procedure of Example 1 with the following modifications.

Polymerization is conducted at 15° C. with 10% diethyl ether to obtain 50% 1,2-addition.

The precursor butadiene polymer having terminal lithium atoms is aminated by a ring opening reaction with a diaziridine, 1,5-diazabicyclo[3.1.0]hexane as described in U.S. Pat. No. 4,753,991 which is incorporated by reference herein. The polymer is hydrolyzed by treatment with an excess of acetic acid (2 hours, 90° C.) and recovered by coagulation in methanol.

Before hydrogenation, the amine terminated polymer is reacted in cyclohexane with a slight excess of acetyl chloride (using pyridine as a promoter) to exhaustively acylate the amine groups to amide groups. The amide groups are returned to amine groups during catalyst extraction with aqueous sulfuric acid.

EXAMPLE 10 (HYPOTHETICAL)

A 1000 ml four neck flask is fitted with a mechanical stirrer, a pH probe, an aqueous caustic inlet tube, and a Claisen adapter to which there is attached a dry ice condenser and a gas inlet tube. The flask is charged with 400 ml of water, 500 ml of methylene chloride, 1.0 ml of triethylamine, 2.0 g (0.0133 moles for 3.3 molar percent) of p-tertiarybutylphenol, 5.0 g (0.0014 moles) of the hydrogenated butadiene polymer of Example 5, and 91.3 g (0.40 moles) of bisphenol-A. With stirring, phosgene is introduced into the flask at a rate of 1 g/min for 50 minutes with the pH maintained in a range of 10.5 to 11.5 by addition of 50% aqueous sodium hydroxide. The resin layer is then separated from the brine layer, washed with 3 wt% aqueous HCl until washing remains acidic, then twice washed with distilled water. The resin is then precipitated into methanol in a Waring blender and washed with methanol. The resin is useful as a molding resin to prepare exterior components of automobiles.

EXAMPLE 11 (HYPOTHETICAL)

Example 10 is repeated by replacing the hydrogenated butadiene polymer of Example 5 with 5.0 g (0.0005 moles) of the hydrogenated butadiene polymer of Example 6.

EXAMPLE 12 (HYPOTHETICAL)

Example 10 is repeated by replacing the hydrogenated butadiene polymer of example 5 with 5.0 g (0.0003 moles) of the hydrogenated butadiene polymer of Example 7.

EXAMPLE 13 (HYPOTHETICAL)

A 1000 ml four neck flask is fitted with a mechanical stirrer, a pH probe, an aqueous caustic inlet tube, and a Claisen adapter to which there is attached a dry ice condenser and a gas inlet tube. The flask is charged with 400 ml of water, 550 ml of methylene chloride, 0.5 ml of triethylamine, 5.5 g (0.0016 moles) of the hydrogenated butadiene polymer of Example 5, and 65 g (0.285 moles) of bisphenol-A. With stirring, phosgene is introduced into the flask at a rate of 0.75 g/min for 36 minutes with the pH maintained in a range of 10.5 to 11.7 by addition of 50% aqueous sodium hydroxide. The resin layer is then separated and washed as described in Example 10 from the brine layer, washed with 3 wt% aqueous HCl until washing remains acidic, then twice washed with distilled water. The resin is then precipitated into methanol in a Waring blender and washed with methanol. The resin is useful as a molding resin to prepare gaskets.

EXAMPLE 14 (HYPOTHETICAL)

Example 13 is repeated by replacing the hydrogenated butadiene polymer of Example 5 with 5.5 g (0.00055 moles) of the hydrogenated butadiene polymer of Example 6.

EXAMPLE 15 (HYPOTHETICAL)

Example 13 is repeated by replacing the hydrogenated butadiene polymer of Example 5 with 5.5 g (0.0003 moles) of the hydrogenated butadiene polymer of Example 7.

EXAMPLE 16 (HYPOTHETICAL)

A 1000 ml four neck flask is fitted with a mechanical stirrer, a pH probe, an aqueous caustic inlet tube, and a Claisen adapter to which there is attached a dry ice condenser and a gas inlet tube. The flask is charged with 400 ml of water, 500 ml of methylene chloride, 3.0 ml of triethylamine, 0.65 g (0.004 moles) of p-tertiary-butylphenol, 40.0 g (0.011 moles) of the hydrogenated butadiene polymer of Example 5, 30 g (0.131 moles) of bisphenol-A, and 45 g (0.083 moles) of tetrabromo-bis-phenol-A. With stirring, phosgene is introduced into the flask at a rate of 1 g/min for 5 minutes at an initial pH of from 8.0 to 9.0. Then phosgenation is continued for an additional 21 minutes while maintaining the pH within the range of 10.5 to 11.5 by addition of 50% aqueous sodium hydroxide. The resin layer is then separated from the brine layer, washed with 3 wt % aqueous HCl until washing remains acidic, then twice washed with distilled water. The resin is then precipitated into methanol in a Waring blender and washed with methanol. The resin is useful for extruding radio-opaque tubing for use as venous catheters.

EXAMPLE 17 (HYPOTHETICAL)

Example 16 is repeated by replacing the hydrogenated butadiene polymer of Example 5 with 40.0 g (0.004 moles) of the hydrogenated butadiene polymer of Example 6.

EXAMPLE 18 (HYPOTHETICAL)

Example 16 is repeated by replacing the hydrogenated butadiene polymer of Example 5 with 40.0 g (0.0025 moles) of the butadiene polymer of Example 7.

EXAMPLE 19 (HYPOTHETICAL)

A polyamide-hydrogenated butadiene block copolymer is produced by reacting 945.7 g (8.31 moles) of caprolactam, 4.3 g (0.029 moles) of adipic acid, and 50 g (0.0145 moles) of the hydrogenated butadiene polymer of Example 5 in a 2 liter stainless steel reactor in the presence of 1 g of catalyst (85% by weight phosphoric acid in water) at 200° C. and a stirring speed of 200 rpm. After two hours of reaction, the reaction temperature is raised to 260° C. and a vacuum (0.5 mm Hg) was applied for two hours. The resulting resin is useful as a molding composition to prepare exterior automotive components.

EXAMPLE 20 (HYPOTHETICAL)

A polyamide-hydrogenated butadiene block copolymer is produced by the process of Example 19 except that the reactants are varied to include 674.2 g of the caprolactam, 25.8 g of the adipic acid, and 300 g of the hydrogenated butadiene polymer of Example 6.

EXAMPLE 21 (HYPOTHETICAL)

A polyamide-hydrogenated butadiene block copolymer is produced by the process of Example 19 except that the reactants are varied to include 348.5 g of the caprolactam, 51.5 g of the adipic acid, and 600 g of the hydrogenated butadiene polymer of Example 7.

EXAMPLE 22 (HYPOTHETICAL)

A polyamide-hydrogenated butadiene block copolymer is produced by reacting 948.5 g of caprolactam, 1.5 g of adipic acid, and 50 g of the hydrogenated butadiene polymer of Example 5 in a 2 liter stainless steel reactor in the presence of 1 g of catalyst (85% by weight phosphoric acid in water) at 200° C. and a stirring speed of 200 rpm. After two hours of reaction, the reaction temperature is raised to 260° C. and a vacuum (0.5 mm Hg) was applied for two hours. The resulting resin is useful as a molding composition to prepare exterior automotive components.

EXAMPLE 23 (HYPOTHETICAL)

A polyamide-hydrogenated butadiene block copolymer is produced by the process of Example 22 except that the reactants are varied to include 691.2 g of the caprolactam, 8.8 g of the adipic acid, and 300 g of the hydrogenated butadiene of Example 6.

EXAMPLE 24 (HYPOTHETICAL)

A polyamide-hydrogenated butadiene block copolymer is produced by the process of Example 22 except that the reactants are varied to include 382.5 g of the caprolactam, 17.5 g of the adipic acid, and 600 g of the hydrogenated butadiene polymer of Example 7.

EXAMPLE 25 (HYPOTHETICAL)

A polyamide-hydrogenated butadiene block copolymer is produced by reacting 949.1 g of caprolactam, 0.9 g of adipic acid, and 50 g of the hydrogenated butadiene polymer of Example 5 in a 2 liter stainless steel reactor in the presence of 1 g of catalyst (85% by weight phosphoric acid in water) at 200° C. and a stirring speed of 200 RPM. After two hours of reaction, the reaction temperature is raised to 260° C. and a vacuum (0.5 mm Hg) was applied for two hours. The resulting resin is useful as a molding composition to prepare exterior automotive components.

EXAMPLE 26 (HYPOTHETICAL)

A polyamide-hydrogenated butadiene block copolymer is produced by the process of Example 25 except that the reactants are varied to include 694.5 g of the caprolactam, 5.5 g of the adipic acid, and 300 g of the hydrogenated butadiene of Example 6.

EXAMPLE 27 (HYPOTHETICAL)

A polyamide-hydrogenated butadiene block copolymer is produced by the process of Example 25 except that the reactants are varied to include 389.0 g of the caprolactam, 11.0 g of the adipic acid, and 600 g of the hydrogenated butadiene of Example 7.

EXAMPLE 28 (HYPOTHETICAL)

A polyamide-hydrogenated butadiene block copolymer is produced by refluxing 419.7 g (3.62 moles) of hexamethylene diamine, 530.3 g (3.62 moles) of adipic acid, and 50 g (0.0145 moles) of the hydrogenated butadiene polymer of Example 5 in a resin kettle at a temperature between 120° to 150° C. for 3 hours under a nitrogen blanket. The mixture is then gradually heated from reflux temperature to 200° C. while water is removed by distillation. Six drops of phosphoric acid are added, and the mixture is heated at 220° to 240° C. under a vacuum of 0.05 to 5 mm Hg for 3 hours. The resulting copolymer is allowed to cool to room temperature. The resin is useful as a component for exterior automotive applications.

EXAMPLE 29 (HYPOTHETICAL)

A polyamide-hydrogenated butadiene block copolymer is produced by the process of Example 28 except that the reactants are varied to include 350.4 g of the hexamethylene diamine, 449.5 g of the adipic acid, and 200 g of the hydrogenated butadiene polymer of Example 5.

EXAMPLE 30 (HYPOTHETICAL)

A polyamide-hydrogenated butadiene block copolymer is produced by refluxing 420.3 g of hexamethylene diamine, 529.7 g of adipic acid, and 50 g of the hydrogenated butadiene polymer of Example 6 in a resin kettle at a temperature between 120 to 150° C. for 3 hours under a nitrogen blanket. The mixture is then gradually heated from reflux temperature to 200° C. while water is removed by distillation. Six drops of phosphoric acid are added, and the mixture is heated at 220° to 240° C. under a vacuum of 0.05 to 5 mm Hg for 3 hours. The resulting copolymer is allowed to cool to room temperature. The resin is useful as a component for exterior automotive applications.

EXAMPLE 31 (HYPOTHETICAL)

A polyamide-hydrogenated butadiene block copolymer is produced by the process of Example 30 except that the reactants are varied to include 352.9 g of the hexamethylene diamine, 447.1 g of the adipic acid, and 200 g of the hydrogenated butadiene polymer of Example 6.

EXAMPLE 32 (HYPOTHETICAL)

A polyamide-hydrogenated butadiene block copolymer is produced by refluxing 420.4 g of hexamethylene diamine, 529.6 g of adipic acid, and 50 g of the hydrogenated butadiene polymer of Example 7 in a resin kettle at a temperature between 120° to 150° C. for 3 hours under a nitrogen blanket. The mixture is then gradually heated from reflux temperature to 200° C. while water is removed by distillation. Six drops of phosphoric acid are added, and the mixture is heated at 220° to 240° C. under a vacuum of 0.05 to 5 mm Hg for 3 hours. The resulting copolymer is allowed to cool to room temperature. The resin is useful as a component for exterior automotive applications.

EXAMPLE 33 (HYPOTHETICAL)

A polyamide-hydrogenated butadiene block copolymer is produced by the process of Example 32 except that the reactants are varied to include 353.4 g of the hexamethylene diamine, 446.6 g of the adipic acid, and 200 g of the hydrogenated butadiene polymer of Example 7.

EXAMPLE 34 (HYPOTHETICAL)

A polyester-hydrogenated butadiene block copolymer is produced by charging into a 1 liter reaction kettle 45.0 g of 1,4-butanediol, 3.8 g of the hydrogenated butadiene polymer of Example 7, 48.5 g of dimethyl terephthalate, 0.129 g of titanium butoxide, and 0.129 g of Irganox 1098, an antioxidant. Transesterification of the reactants is carried out at 180° C. for 2.5 hours under a nitrogen blanket. The methanol released by the reaction is collected in a condenser. The temperature is then raised to 245° C. to start polymerization. Vacuum is applied slowly over a 15 minute period to 0.15 mm Hg. About one-half of the 1,4-butanediol is distilled off and then polymerization is continued for 3 hours. The resulting polymer is useful as a molding compound for exterior automotive components.

EXAMPLE 35 (HYPOTHETICAL)

A polyester-hydrogenated butadiene block copolymer is produced by the process of Example 34 except that the reactants are modified to contain 30.6 g of the hydrogenated butadiene polymer of Example 5.

EXAMPLE 36 (HYPOTHETICAL)

A polyester-hydrogenated butadiene block copolymer is produced by the process of Example 34 except that the reactants are modified to contain 107.3 g of the hydrogenated butadiene polymer of Example 5.

EXAMPLE 37 (HYPOTHETICAL)

A polyester-hydrogenated butadiene block copolymer is produced by charging into a 1 liter reaction kettle 45.0 g of 1,3-propanediol, 3.6 g of the hydrogenated butadiene polymer of Example 5, 48.5 g of dimethyl terephthalate, 0.129 g of titanium butoxide, and 0.129 g of Irganox 1098, an antioxidant. Transesterification of the reactants is carried out at 180° C. for 2.5 hours under a nitrogen blanket. The methanol released by the reaction is collected in a condenser. The temperature is then raised to 245° C. to start polymerization. Vacuum is applied slowly over a 15 minute period to 0.15 mm Hg. About one-half of the 1,3-propanediol is distilled off and then polymerization is continued for 3 hours. The resulting polymer is useful as a molding compound for exterior automotive components.

EXAMPLE 38 (HYPOTHETICAL)

A polyester-hydrogenated butadiene block copolymer is produced by the process of Example 37 except that the reactants are modified to contain 28.9 g of the hydrogenated butadiene polymer of Example 5.

EXAMPLE 39 (HYPOTHETICAL)

A polyester-hydrogenated butadiene block copolymer is produced by the process of Example 37 except that the reactants are modified to contain 101.3 g of the hydrogenated butadiene polymer of Example 5.

EXAMPLE 40 (HYPOTHETICAL)

A polyester-hydrogenated butadiene block copolymer is produced by charging into a 1 liter reaction kettle 31.0 g of 1,2-ethanediol, 3.4 g of the hydrogenated butadiene of Example 5, 48.5 g of dimethyl terephthalate, 0.129 g of titanium butoxide, and 0.129 g of Irganox 1098, an antioxidant. Transesterification of the reactants is carried out at 180° C. for 2.5 hours under a nitrogen blanket. The methanol released by the reaction is collected in a condenser. The temperature is then raised to 245° C. to start polymerization. Vacuum is applied slowly over a 15 minute period to 0.15 mm Hg. About one-half of the 1,2-ethanediol is distilled off and then polymerization is continued for 3 hours. The resulting polymer is useful as a molding compound for exterior automotive components.

EXAMPLE 41 (HYPOTHETICAL)

A polyester-hydrogenated butadiene block copolymer is produced by the process of Example 40 except that the reactants are modified to contain 27.4 g of the hydrogenated butadiene polymer of Example 5.

EXAMPLE 42 (HYPOTHETICAL)

A polyester-hydrogenated butadiene block copolymer is produced by the process of Example 40 except that the reactants are modified to contain 96.0 g of the hydrogenated butadiene polymer of Example 5.

EXAMPLE 43

A polyurethane coating was prepared by placing 54.1 parts by weight (pbw) of the hydroxyl terminated, hydrogenated polybutadiene diol of Example 3, 0.01 pbw of dibutyl tin dilaurate and 36.0 pbw of toluene into a jar. The jar was capped and placed on a shaker for 30 minutes. Then 9.9 pbw of the isocyanate DESMODURZ-4370 (ex. Miles) were added to the jar and the jar was returned to the shaker for 30 minutes. This mixture was applied with a paint brush to a steel panel. After drying/curing for 2 weeks at room temperature, the coated film was useful as a clear, elastomeric, polyurethane coating.

EXAMPLE 44

A polyurethane coating was prepared by placing 33.6 pbw of the hydrogenated polybutadiene diol of Example 3, 0.004 pbw of dibutyl tin dilaurate, 22.4 pbw of toluene, and 37.9 pbw of the titanium dioxide TI-PURE R-902 (ex. DuPont) into a jar. Grinding grit was then added to the jar. This mixture was rolled on a bottle roller until the $TiO_2$ particle size was reduced to a Hegman 6 "fineness of grind". This took about 3 days of rolling the jar. The blend was filtered to remove the grinding grit. To 93.9 pbw of this blend was added 6.1 pbw of the isocyanate DESMODUR Z-4370.

After thoroughly mixing in the isocyanate, the mixture was applied with a 10 mil doctor blade onto a steel panel. After drying/curing for 2 weeks at room temperature, the coated film was useful as a white, elastomeric, polyurethane coating.

EXAMPLE 45 (HYPOTHETICAL)

An isocyanate terminated prepolymer is prepared by placing 44.3 pbw of the hydrogenated polybutadiene diol of Example 5, 5.7 pbw of a diphenyl methane diisocyanate (2/1 NCO/OH), and 50 pbw of toluene into a jar and gently rolling the jar for 2 weeks at room temperature. Then 100 pbw of this prepolymer is mixed with 50 pbw of WINGTACK 95 hydrocarbon tackifying resin (ex. Goodyear) and 100 pbw of ATOMITE calcium carbonate (ex. Thompson Weiman) in a sigma blade mixer under a dry nitrogen blanket. The material is then packaged with critical exclusion of moisture until the package is opened for use. The material is useful as a moisture-curable, polyurethane/urea sealant, caulk, or coating.

EXAMPLE 46 (HYPOTHETICAL)

An acrylate terminated prepolymer is prepared by placing 3.5 pbw of hydroxy ethyl acrylate, 6.7 pbw isophorone diisocyanate (2/1 NCO/OH), 0.007 pbw dibutyl tin dilaurate, and 30 pbw xylene into a resin kettle. With gentle stirring, this mixture is heated to 80° C. and held for 3 hours. Then 59.8 pbw of the hydrogenated polybutadiene diol from Example 5 is added and heating is continued for another 3 hours at 80° C. to give the acrylate terminated prepolymer. This material is useful in coatings, sealants and adhesives which are cured by free radical processes, initiated for example by peroxides or radiation.

EXAMPLE 47 (HYPOTHETICAL)

A water-borne polyurethane/urea dispersion is prepared by charging 53.1 pbw of the hydrogenated polybutadiene diol of Example 5, 14.0 pbw of the isocyanate DESMODUR W (ex. Miles), 3.5 pbw of dimethylol propionic acid, and 23.6 pbw of xylene to a resin kettle. This mixture is heated to 80° C. and is held for 4 hours to prepare the isocyanate terminated prepolymer. Then 2.7 pbw of triethyl amine is added to ionize the acid groups and heating is continued for another hour. This product is then dispersed in 290 pbw of water and 3.1 pbw of DYTEK A is quickly added. Heating at 80° C. is continued for another hour to chain extend the prepolymer giving the water-borne polyurethane/urea dispersion. This material is useful as a low VOC coating.

EXAMPLE 48 (HYPOTHETICAL)

A bake-cured coating was prepared by mixing 40 pbw of the hydrogenated polybutadiene diol of Example 3, 9 pbw CYMEL 303 hexamethoxy melamine resin (ex. American Cyanamid), 1 pbw of CYCAT 600 acid catalyst (ex. American Cyanamid), and 50 pbw of toluene in a jar on a bottle roller overnight. Coatings about 2 mils thick were cast on polyester film with a 10 mil doctor blade. The coatings are cured for 10, 20, or 30 minutes in an oven at 150° C. Gel contents measured on these films were 81%, 84%, and 92%, respectively. (Gel content is the percentage of material in the coating which is insoluble in toluene after the coating is baked.) These compositions should be useful in amino resin cured coatings.

EXAMPLE 49 (HYPOTHETICAL)

A saturated polyester resin (1.3/1 OH/COOH) is prepared by charging 55.5 g of the hydrogenated butadiene diol of Example 3, 102.3 g of neopentyl glycol, 9.9 g of trimethylol propane, 70.4 g of isophthalic acid, 61.9 g of adipic acid, 0.40 g of dibutyl tin dilaurate, and 30 g of xylene to a 500 ml resin kettle equipped with a stirrer and a partial condenser. The ingredients are carefully heated to 230° C. under a nitrogen purge. The esterification reaction is continued at 230° C. for 6 hours. After cooling to room temperature, the product is a sticky, opaque mass. The product is useful as a toughened, high solids, hydroxyl terminated, polyester resin for coatings.

We claim:

1. A polymer composition, produced by the steps of:

reacting one or more compounds with the terminal functional groups on a polymer, and said polymer consists essentially of:

polymerized 1,3-butadiene having a peak molecular weight between 500 and 20,000, 1,2-addition between 30% and 70%, and hydrogenation of at least 90% of the unsaturation;

*a ratio of viscosity (in poise at room temperature) to peak molecular weight raised to the 3.4 power of at most 2.0 times* $10^{-9}$; and

[one] *about two* or more terminal functional groups per molecule.

2. The polymer *composition* of claim [1] *6*, wherein the terminal functional groups *of the polymer* are selected from [a] *the* group consisting of hydroxyl, carboxyl, phenol, epoxy, and amine groups.

[3. The polymer of claim 2, wherein the polymer has a ratio of viscosity (poise at room temperature) to peak molecular weight raised to the 3.4 power of at most $2.0\times 10^{-9}$.]

4. The polymer *composition* of claim [3] *6*, wherein the polymerized *1,3*-butadiene has a peak molecular weight between 1,000 and 10,000.

5. The polymer *composition* of claim 4, wherein the polymerized *1,3*-butadiene is at least 95% hydrogenated.

6. The polymer *composition* of claim [5] *1*, wherein the ratio of viscosity to peak molecular weight raised to the 3.4 power *of the polymer* is less than 1.0 [×] *times* $10^{-9}$.

7. The polymer *composition* of claim 6, wherein the terminal functional groups *of the polymer* consist of about two hydroxyl groups per molecule.

8. The polymer *composition* of claim 1, wherein the peak molecular weight *of the polymer* is between 1000 and 10000.

9. The polymer *composition* of claim [8] *6*, wherein the 1,2-addition of the polymerized *1,3*-butadiene is between 40% and 60%.

10. The polymer composition of claim 1, wherein the polymerized 1,3-butadiene has about two hydroxyl groups per molecule.

11. The [polymeric] *polymer* composition of claim 10, wherein the polymerized 1,3-butadiene is reacted with compounds that form a coating.

12. The [polymeric] *polymer* composition of claim 10, wherein the polymerized 1,3-butadiene is reacted with compounds that form a block selected from *the group consisting of* polyesters, polyamides, and polycarbonates.

*13. The polymer composition of claim 8 wherein the polymer has a peak molecular weight of about 10,000.*

*14. The polymer composition of claim 8 wherein the polymer has a peak molecular weight of about 5,000.*

*15. The polymer composition of claim 8 wherein the polymer has a peak molecular weight of about 3,000.*

*16. The polymer composition of claim 8 wherein the polymer has a peak molecular weight of about 2,000.*

*17. The polymer composition of claim 4 wherein the polymer has a peak molecular weight of about 10,000.*

*18. The polymer composition of claim 4 wherein the polymer has a peak molecular weight of about 5,000.*

*19. The polymer composition of claim 4 wherein the polymer has a peak molecular weight of about 3,000.*

*20. The polymer composition of claim 4 wherein the polymer has a peak molecular weight of about 2,000.*

*21. The polymer composition of claim 1 wherein the polymerized 1,3-butadiene has 1.7 terminal functional groups per molecule.*

*22. The polymer composition of claim 1 wherein the polymerized 1,3-butadiene has 1.9 terminal functional groups per molecule.*

* * * * *